United States Patent
Link et al.

(10) Patent No.: US 10,659,353 B2
(45) Date of Patent: May 19, 2020

(54) DYNAMIC SCRIPTABLE ROUTING

(71) Applicant: International Business Machines Corporation, Armonk, NY (US)

(72) Inventors: Claudius Link, Kassel (DE); Matthias Seul, Kassel (DE); Artemiy A. Solyakov, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 15/342,732

(22) Filed: Nov. 3, 2016

(65) Prior Publication Data
US 2018/0123952 A1 May 3, 2018

(51) Int. Cl.
| | |
|---|---|
| *H04L 12/781* | (2013.01) |
| *H04L 12/823* | (2013.01) |
| *H04L 29/06* | (2006.01) |
| *H04L 12/701* | (2013.01) |
| *H04L 12/751* | (2013.01) |
| *H04L 29/12* | (2006.01) |

(52) U.S. Cl.
CPC .............. *H04L 45/52* (2013.01); *H04L 47/32* (2013.01); *H04L 69/22* (2013.01); *H04L 45/00* (2013.01); *H04L 45/02* (2013.01); *H04L 61/6086* (2013.01)

(58) Field of Classification Search
CPC ......... H04L 45/52; H04L 47/32; H04L 69/22; H04L 61/6086
See application file for complete search history.

(56) References Cited

U.S. PATENT DOCUMENTS

| | | | |
|---|---|---|---|
| 8,189,605 B2 | 5/2012 | Sindhu et al. | |
| 8,982,887 B2 | 3/2015 | Curtis et al. | |
| 2006/0206432 A1* | 9/2006 | Russell | G06F 21/10 705/57 |
| 2008/0285560 A1* | 11/2008 | Curtis | H04L 45/00 370/392 |
| 2013/0086267 A1* | 4/2013 | Gelenbe | H04L 45/302 709/225 |
| 2014/0233564 A1* | 8/2014 | Lue | H04L 45/50 370/392 |

(Continued)

FOREIGN PATENT DOCUMENTS

CN 102377670 A 3/2012

OTHER PUBLICATIONS

Naous, J., "Path-Policy Compliant Networking and a Platform for Heterogeneous IAAS Management," Standford University, Mar. 2011.

(Continued)

Primary Examiner — Oussama Roudani
(74) Attorney, Agent, or Firm — Pepper Hamilton LLP

(57) ABSTRACT

Embodiments are directed to a sender side of a network communication, being sent from a sender to a destination over a network path, expressing certain conditions and actions in a form of a script and encoding the script into network packets, thus enabling routing decisions to be made. Routing devices along the network path are equipped with an execution environment and an application program interface (API) to allow the script to execute and intervene (i.e., "talk" with the routing device) in the routing process. Embodiments provided herein may be implemented to coexist with other existing routing protocols or may completely replace other existing routing protocols.

14 Claims, 10 Drawing Sheets

(56) References Cited

U.S. PATENT DOCUMENTS

| | | | | |
|---|---|---|---|---|
| 2014/0280717 A1* | 9/2014 | Frost | ..................... | H04L 67/10 |
| | | | | 709/217 |
| 2015/0120924 A1* | 4/2015 | Scott | ..................... | H04L 69/22 |
| | | | | 709/225 |
| 2016/0043940 A1 | 2/2016 | Mahadevan et al. | | |
| 2016/0378450 A1* | 12/2016 | Fu | ........................... | G06F 8/61 |
| | | | | 717/177 |
| 2017/0005922 A1* | 1/2017 | Tantsura | ................ | H04L 45/72 |

OTHER PUBLICATIONS

Combined Search and Examination Report dated Mar. 28, 2018 in corresponding British Patent Application No. GB1717510.0.

\* cited by examiner

DYNAMIC SCRIPTABLE ROUTING

BACKGROUND

Network routing allows a system to find a network path to another system. Traditionally, each routing device along the way makes a decision as to the next step in the network path. To make this decision, a routing device must have certain information about the network. This information can be dynamically obtained through routing protocols or statically configured on a routing device. Routing protocols may be classified into two groups: distance-vector routing protocols and link-state routing protocols. Both use certain metrics, such as distance in hops and network bandwidth, to calculate the best route for a particular destination. However, the metrics do not allow for more complex scenarios; instead the metrics merely provide hints in the routing decision. While some existing routing protocols may dynamically adapt and react to a changing network environment, they are limited by their predefined algorithms in the decision making process.

SUMMARY

Embodiments are directed to an approach for routing schemes, for sending a network communication over a network path, that shifts the decision making from intermediate routing devices to a sender side of the network communication, resulting in exceeding limitations of existing routing protocols.

In an embodiment, a computer-implemented method and a system are provided for dynamically altering routing decisions of internet protocol (IP) packets being sent through a network of interconnected devices.

In an embodiment, the system comprises a network device that is part of the network of interconnected devices, the network device comprising a processor configured to execute the method steps of: extending an IP packet to add a routing script, wherein routing requirements and decisions of a client are stored in the routing script; extending client software and protocols of the network device to execute the routing script; extracting the routing script from the IP packet; executing the routing script to obtain script results; changing a routing decision based on the script results; and delivering the extended IP packet to a destination system based on the changed routing decision.

In an additional embodiment, a computer implemented method to dynamically alter routing decisions of internet protocol (IP) packets being sent through a network of interconnected devices comprises: extending a network packet to include code payload executable on a network device, wherein the code payload includes user-defined algorithms and user-defined constraints used by a decision making module on the network device; and extending network device software and network protocols to provide an execution environment for the code payload upon receiving the network packet, wherein the code payload of the packet is executed on the execution environment of the network device. Execution of the code payload extends existing network device algorithms to provide an adaptive routing decision process, wherein the routing decision process is based on the execution of the user-defined code payload and context provided by the execution environment.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1A:
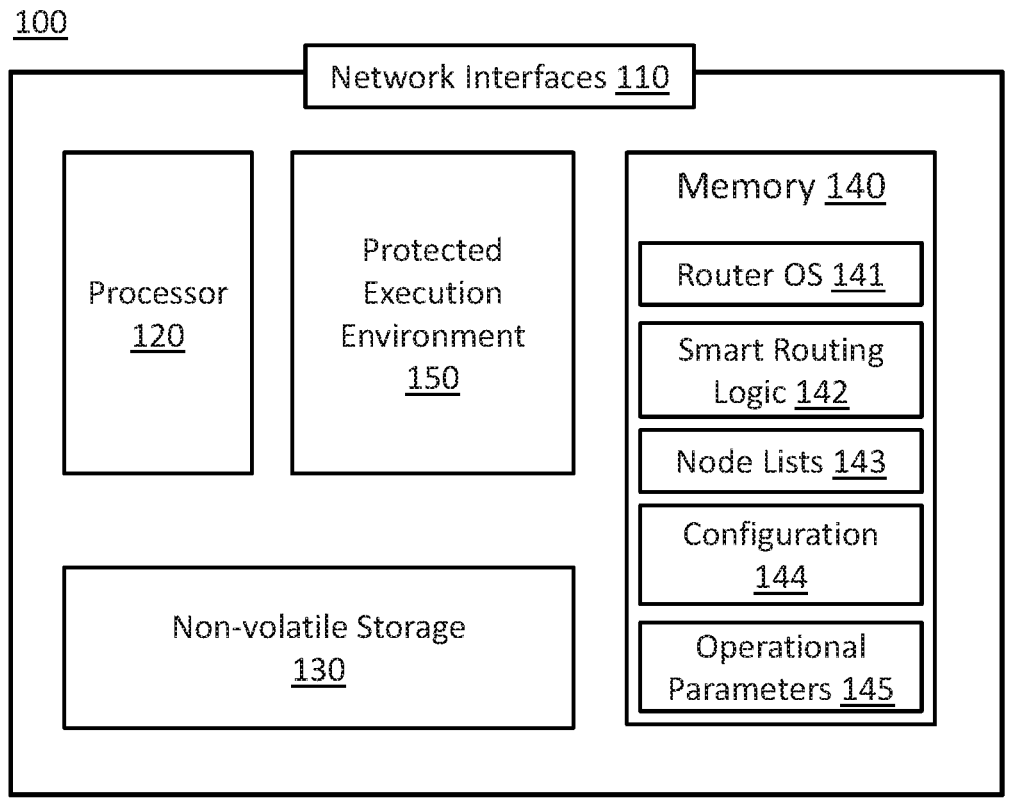
FIG. 1A is a diagram depicting a smart routing device, according to embodiments herein.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

According to embodiments disclosed herein, a sender side of a network communication, being sent from a sender to a destination over a network path, expresses certain conditions and actions in a form of a script and encodes the script into network packets, thus enabling routing decisions to be made. Routing devices along the network path are equipped with an execution environment and an application program interface (API) to allow the script to execute and intervene (i.e., "talk" with the routing device) in the routing process. Embodiments provided herein may be implemented to coexist with other existing routing protocols or may completely replace other existing routing protocols.

According to one embodiment, existing routing devices may be extended by introducing a smart routing extension module (SREM), which provides additional capabilities for handling packets, thereby transforming existing routing devices into smart routing devices. In another embodiment, a standalone smart routing device (SRD) is provided. The SRD includes capabilities of a traditional router, in addition to the capabilities provided herein, while the SREM implements the routing decision process described according to embodiments herein and defers actual packet management to the routing device to which it is attached. In the following description, it is understood that the terms SREM and SRD may be used interchangeably.

FIG. 1A is a diagram depicting a smart routing device (SRD) 100, according to embodiments provided herein. As shown in FIG. 1A, the SRD 100 includes a network interface 110, for interfacing with network devices such as other routing devices, a processor 120, non-volatile storage 130 (e.g., flash memory), memory 140, and a protected execution environment 150. The memory 140 may include various components and/or modules, including router operating system (OS) 141, smart routing logic 142, node lists 143, configuration data 144, and operational parameters 145.

Figure 1B:
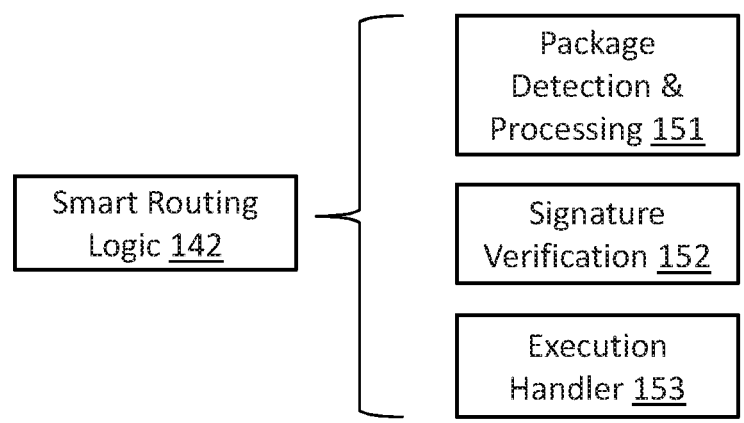
FIG. 1B is a diagram depicting a smart routing logic module of the smart routing device shown in FIG. 1A, according to embodiments herein.

According to an embodiment, as shown in FIG. 1B, the smart routing logic 142 includes package detection and processing module 151, signature verification module 152, and execution handler module 153. The smart routing logic 142 (i.e., the modules 151, 152, and 153) implements the following functions: interacting with network traffic passing through the SRD 100; intercepting incoming traffic for examination; recognizing smart packets in the intercepted traffic; reading the smart packets to extract additional payload information; processing the payload information for security signing and active executable content (e.g., in the form of a scripting language); dropping packets with invalid or unknown signing; providing an execution environment (i.e., the protected execution environment 150) for executable content by providing a script interpreter, read-only system information containers, and a write-only result container; interpreting results from running the executable content in the execution environment; and adjusting the routing of packets based on results from running the executable content in accordance with router policies.

Moreover, according to an embodiment, the smart routing logic 142 actively maintains a list of smart capable router peers by implementing the following functionality: creating and maintaining a list of known, connected routing nodes (i.e., "boxes"); regularly (i.e., at predefined intervals) querying entries on the list of known, connected routing nodes using a specifically crafted smart packet; marking a node as "smart" capable if the node responds in a correct manner to the smart packet; and marking a node as "not smart" capable if the node does not respond, responds with an error, or responds with a packet this is malformed or not properly signed.

The SRD 100, according to an embodiment, integrates into existing networks by piggy-backing onto existing standards, such as Internet Protocol version 4 (IPv4) and Internet Protocol version 6 (IPv6). The SRD 100 retains compatibility with non-smart devices by attaching smart payloads at the end of the original packet for IPv4 and IPv6, or attaching smart payloads as part of the header for IPv6; updating the packet structure (e.g., size, cyclic redundancy code (CRC), etc.) to reflect the modification; preventing routing of smart packets to non-smart devices unless configured otherwise; and removing smart payloads and restoring the original packet if routing to a non-smart device is required.

According to embodiments, for consistent end-to-end handling of packets within a network, the nodes in the network are trusted smart devices, where the trust is established via known signing methods further described herein. In another embodiment, network edges may be equipped with smart devices (e.g., a SRD 100) if an operator is able to control all network edges to prevent possible leaking or routing to unauthorized devices.

Figure 2:
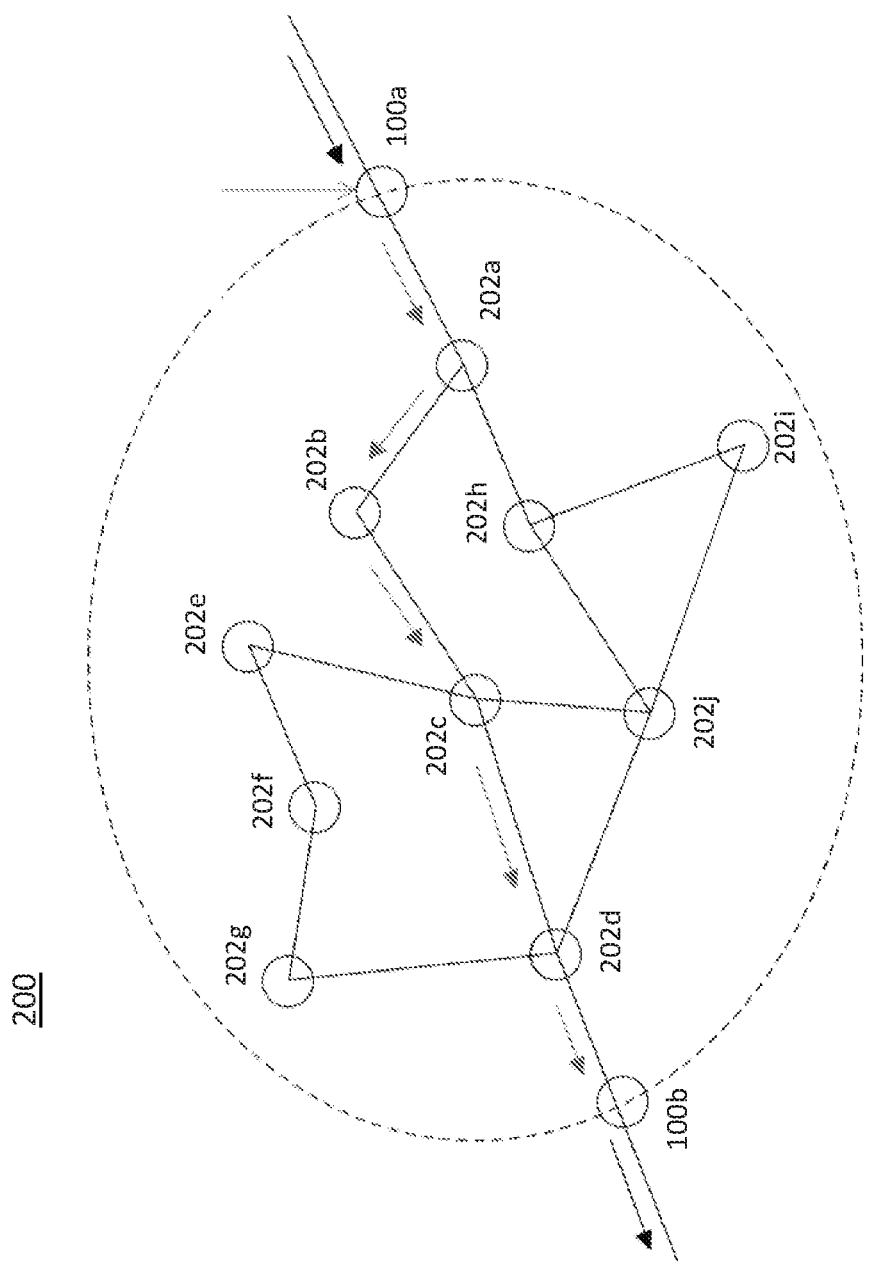
FIG. 2 is a diagram depicting an exemplary smart network, according to embodiments provided herein.

Referring to FIG. 2, a diagram of an exemplary smart network 200 is provided, according to embodiments provided herein. As shown, a SRD 100a and a SRD 100b are situated at the edge of the network 200. Basic routing devices 202a-202j are utilized for connections within the network 200. Such a deployment enables network operators to route packets more efficiently, respecting preferences of the origination routing device (e.g., 100a) such as the route taken or speed requirements. The deployment as shown in FIG. 2 also enables for certain compliance constraints to be enforced; for example, not routing traffic through specific networks or choosing a designated gateway. Advantageously, a network operator does not need to know the preferences and constraints in advance as the smart routing logic 142 of the origination routing device 100a dynamically implements the routing based on this information. Additionally, since the decisions are dynamically made, updates may be distributed and enforced in real-time. According to an embodiment, the network 200 is deployed in a n:n configuration, where n is greater than or equal to 1. In an embodiment, a minimum configuration requires a pair of SRDs 100 at the edges of a connected network.

Figure 3:
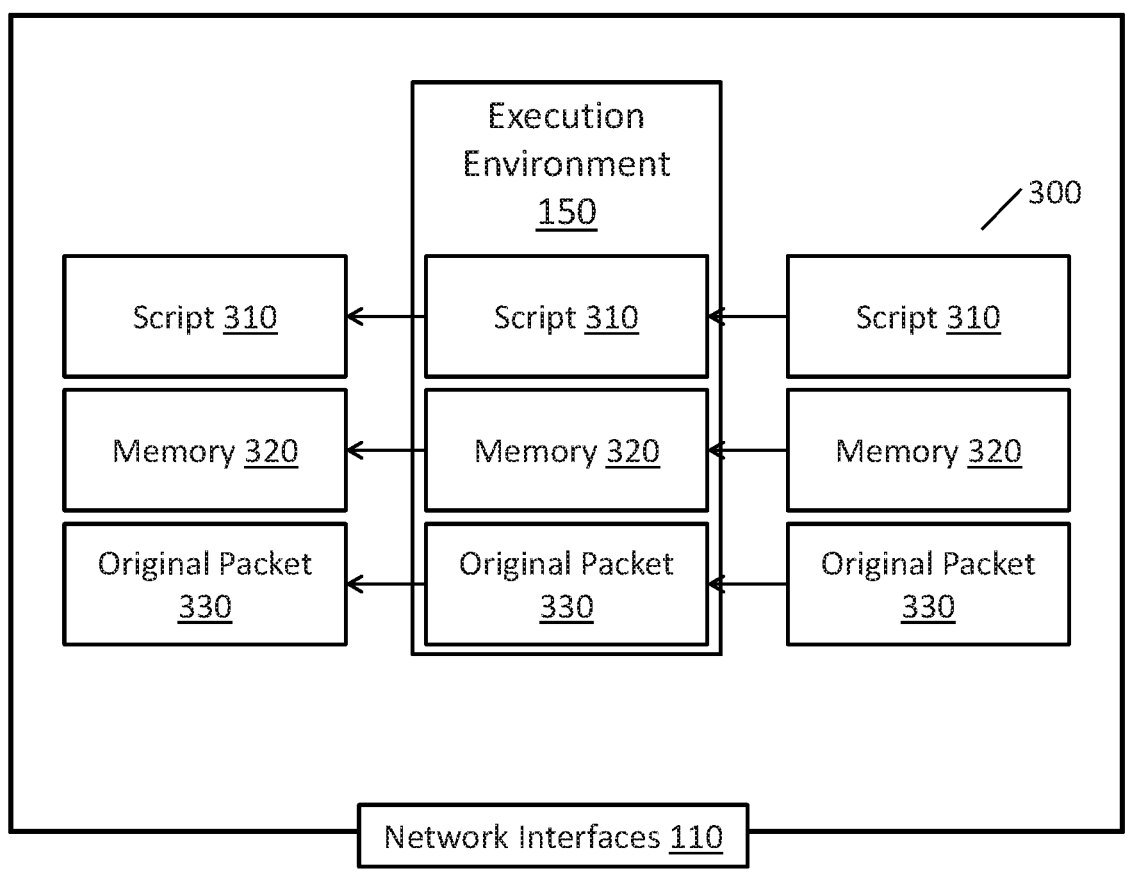
FIG. 3 is a diagram illustrating execution of a smart packet by a smart routing device, according to an embodiment.

FIG. 3 is a diagram illustrating execution of a smart packet 300 by a SRD 100, according to an embodiment. As shown, the smart packet 300 comprises a script 310, memory 320, and an original packet portion 330. The smart packet 300 is inputted into the protected execution environment 150 of the SRD 100. The protected execution environment 150 runs the executable content of the smart packet 300, and outputs the smart packet 300 for processing and routing based on the execution.

A smart packet, according to embodiments, is a regular IP packet extended with a unique payload that contains a set of scripts from which a SRD 100 makes dynamic routing decisions. The extension to the regular IP packet is based on the protocol version being used.

Figure 4A:
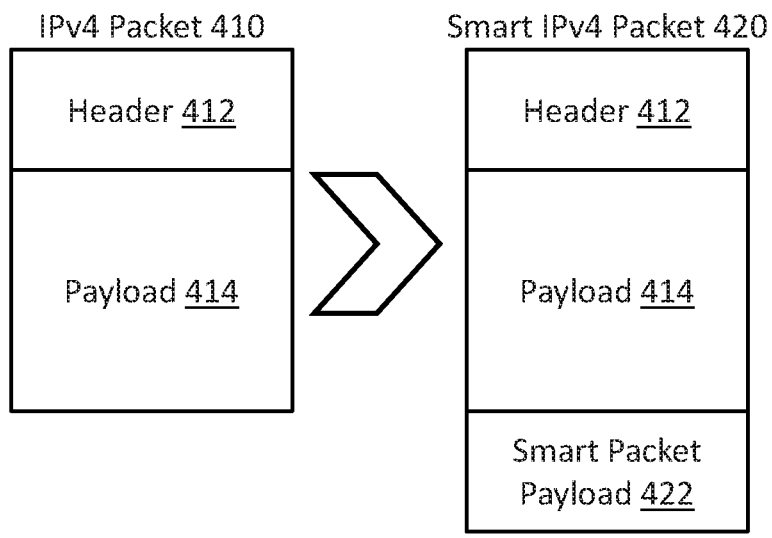
FIGS. 4A and 4B illustrate features of exemplary smart packets, according to embodiments herein.
Figure 4B:
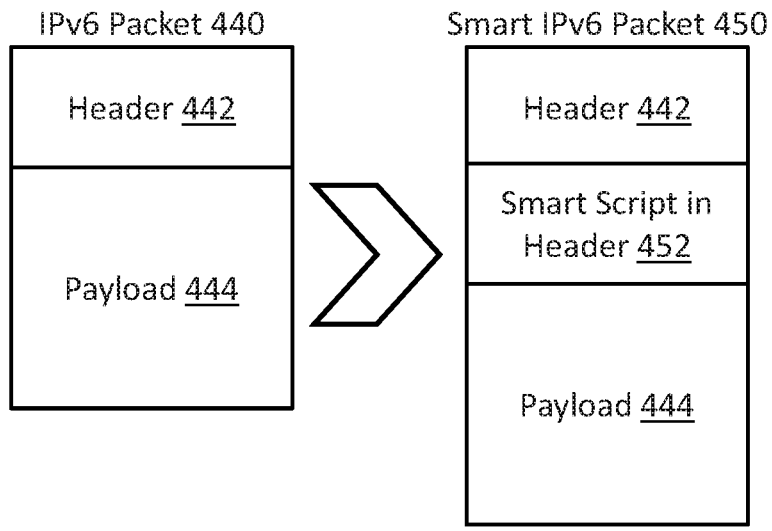

FIGS. 4A and 4B illustrate features of exemplary smart packets, according to embodiments herein, for IPv4 and IPv6, respectively. As shown in FIG. 4A, an IPv4 packet 410 is comprised of header 412 and payload 414. For a smart IPv4 packet 420, the smart packet payload extension 422 is added to the end of the packet as an additional payload, with the packet header 412 updated to reflect the larger overall payload.

For IPv6, the extension can be done in an identical manner as for IPv4 or, as shown in FIG. 4B, as part of an extended IPv6 header. As shown, an IPv6 packet 440 is comprised of header 442 and payload 444. Smart script in header extension 452 is added to the header 442 for IPv6 packet 450.

In an embodiment, the script contents may follow standing scripting standards, such as Python, LUA, or Javascript. As described above, the script is run inside the protected execution environment 150 of the SRD 100 and is able to utilize the environment, routing table, and settings of the SRD 100 to answer queries from the SRD 100. To enable this, the script has a defined entry point, similar to function calls of a C library, that are fixed in naming input parameters. According to an embodiment, a script that ensures chosen route nodes are only from a sender-predetermined list is able to access memory and environment of the SRD 100 and use these to provide the SRD 100 with an updated routing list. This logic is provided by the original sender without the need of establishing a connection back. The script can dynamically react depending on the logic provided.

The SRD 100 is run inside the router's execution environment (protected execution environment 150) and actively intercepts incoming packets on connection level. The packets are stored in a temporary buffer and trigger a processor thread to process the accumulated queue of packets. The SRD 100 inspects the packet header to determine a target network.

According to an embodiment, for smart routing capability determination, the SRD 100 queries the routing tables to determine all possible routes to the destination, sorted by metric descending. With this list, the SRD 100 determines if at least one of the available routes has one or more SREM/SRD, requiring a scrubbing of the packet before it reaches its destination. The scrubbing is required as the smart payload needs to be discarded to avoid compatibility issues with clients that do not know how to handle the extended payload/headers. A final route is determined by sorting the list by SREM/SRD available, then, according to an embodiment, by metric ascending to automatically prefer a SREM/SRD route with the lowest metric. In an embodiment, SREM/SRD routes are preferred even if non-SREM/SRD routes are available with a lower metric. If no suitable routes are found, the SRD 100 either immediately scrubs the packet of any smart payloads/headers to ensure compatibility or denies delivery (depending upon the configuration of the SREM/SRD).

If a suitable route is found, the packet is inspected to determine if it contains a smart payload (either in its header or as an extended payload). If no smart payload or header is found, the SRD 100 reads its built-in or user-configured rule sets to determine how to proceed with outgoing packets. If a rule is established for the destination of the packet to feature specific smart payloads, the SRD 100 loads the payloads from a payload store and injects them into the packet (i.e., into the packet payload or header depending on the rules and the IP version). The SRD 100 also updates the packet size and checksum to ensure proper delivery.

Next, the smart packet script is run. If the packet already has a smart payload or header, these are run within the protected execution environment 150 of the SRD 100. The routing decisions are updated accordingly before being relayed to the next network node.

Prior to setting up the execution environment, the SRD 100 reads a smart payload envelope containing an optional signing container for integrity verification and a requirements list. The optional signing container may contain a signature for the executable script part, allowing verification of both the script originator and integrity of the delivered code. The signature can be built using off-the-shelf signing methods, such as Pretty Good Privacy (PGP). If the signature is found, the SRD 100 may run in one of multiple configurable modes: Mode 1—allow everything (ignore signatures, continue execution immediately); Mode 2—ensure payload integrity (signature will be used to verify payload); or Mode 3—ensure signature is from a trusted source and ensure payload integrity (signature will be checked if from a known, trusted source including full signing chain; payload will be verified).

If Mode 2 or 3 is configured, the SRD 100 will abort execution if validation fails. The SRD 100 may be configured to scrub the packet before delivery, initially block individual packets, or block the sending peer after a certain number of invalid packets have been received.

Figure 5:
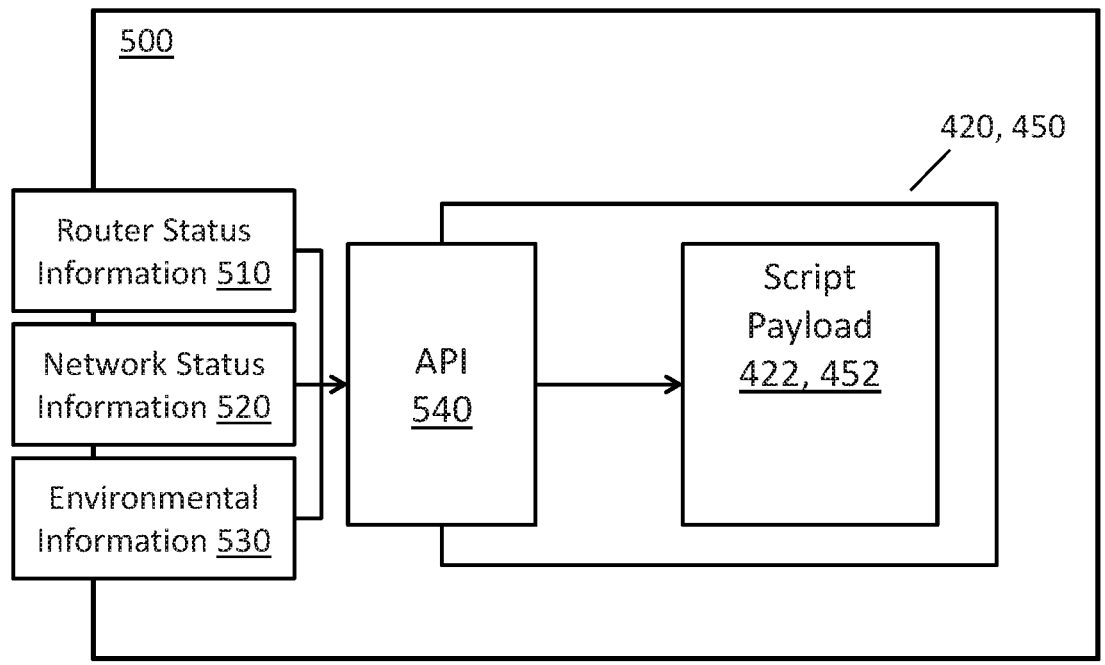
FIG. 5 is a diagram illustrating an exemplary configuration of a protected-memory execution environment, according to an embodiment.
Figure 6:
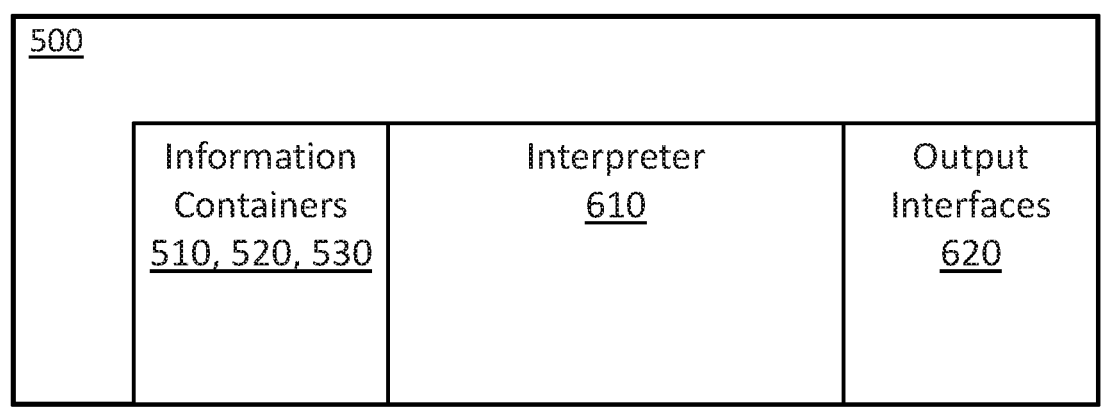
FIG. 6 is a diagram illustrating additional features of the protected-memory execution environment of FIG. 5, according to an embodiment.

After validation, the SRD 100 initializes an isolated sandbox, which is a protected-memory execution environment with no access to other portions of memory of the SRD 100. FIGS. 5 and 6 provide representations of sandbox configuration 500, according to embodiments provided herein. The sandbox 500 is initialized, according to an embodiment, with an environment stack of information containers and a scripting toolbox containing a predefined set of scripting templates and procedures to ease the construction of smart packets and lessen the code required within the smart packet. As shown in FIG. 5, this includes router status information 510, network status information 520, and environmental information 530, which are provided via an API 540 to the smart packet comprising the script payload (e.g., smart packet 420 or 450 with script payload 422 or 452).

The script is then run by entering a standardized entry function. The script itself can be executed using off-the-shelf environments, such as Python or GO. Depending on the environment, a specialized language may be employed. The script may access the information containers 510, 520, 530 to obtain an overview of the environment of the SRD 100 and to deploy output to specified interfaces.

The interface setup may include one or more of the following, according to embodiments: (1) router state: manufacturer, model, firmware version, central processing unit (CPU) utilization, memory utilization, network utilization; (2) network state: interfaces available, interface status, routing list, and direct network peer information (i.e., other devices directly connected to the SRD 100); (3) packet state: hops done, hops allowed, packet source, packet destination; (4) output interfaces: routing verdict, routing list.

FIG. 6 provides additional details of the sandbox configuration 500. As shown, the read-only information containers 510, 520, 530 are populated upon setting up the execution environment (interpreter) 610 and are static in nature. Writes and changes are, according to an embodiment, not permitted for the script. A routing verdict and routing list are used for communication results for the script via the output interfaces 620. This setup reduces the complexity of execution and possible exploitation vectors.

According to an embodiment, the routing verdict is a recommendation by the script on how to continue handling the routing of the packet. The routing verdict may be a combination of aspects, such as: NO_VERDICT (the script has no recommendation, neutral response); BLOCK (stop routing); EXEC_ERROR (script has encountered an internal error); CONTINUE (proceed with routing); REPLACE_ROUTING_LIST (SREM use only suggestions, only in with CONTINUE); PREFER_ROUTING_LIST (SREM use suggestions first, only in with CONTINUE); BACKUP_ROUTING_LIST (SREM use suggestions if original routing fails, only in with CONTINUE); SIGNAL_PEER (send SREM-Signal to peer this packet was received from, with all other states); and USE_ROUTING_LIST.

According to an embodiment, the routing list comprises an updateable list of routing peers. The script has the option to make use of the routing list passed in the information containers 510, 520, 530, or the script can entirely replace the list with a different suggestion. According to an embodiment, the routing list may contain a target network mask, a gateway address, and/or one or more metrics.

If a USE_ROUTING_LIST verdict is encountered, the SRD 100 may opt to follow the script's suggestion. In an embodiment, the SRD 100 may universally follow the suggestion, ignore it entirely, or make it dependent on factors, such as if the packet is coming from known peers, if the packet is destined for known peers, and/or if the signature is valid. If the suggestion is being followed, the provided routing entries are examined. Depending on the configuration, entries may be discarded if the entries are invalid (e.g., incorrect format, incorrect metric, default is set to on); if the entries go to unknown destinations (default is set to on but can be turned off to allow routing to "secret" peers); if the entries are blacklisted by the SRD 100; and/or if the entries go back to the peer that initially sent the packet (default is set to on, to avoid loops). After unacceptable entries are discarded, the SRD 100 may modify the routing list for the packet according to the mode suggested by the script. Once the modification is complete, the execution environment is discarded, and the SRD 100 continues executing upon the packet routing.

According to an embodiment, if the SRD 100 is forced to relay to a peer that does not support smart packets, the SRD 100 removes scripting parts and rebuilds the packet including the packet size and the CRC (i.e., scrubbing of packets). The rebuilt packet is identical in structure to non-smart packets to ensure the receiving peer is able to properly process it.

According to an embodiment, to be able to prefer specific routes for SRD/SREM peers, the SRD 100 needs to build a list of compatible peers for smart routing sensing between nodes. Due to the nature of networks, this list can be seeded with known peers but may require constant or near-constant updates. According to embodiments herein, the SRD 100 solves this issue by sending specifically crafted packets to all of its direct peers. These packets are set up in such a way that they clearly identify as a SRD/SREM sense packet by having an intentionally invalid CRC (set to 3×1337, for example). The SRD 100 also includes a smart packet payload including both a signature and a script that will cause a SIGNAL_PEER verdict. Regular systems are not able to parse such a packet and discard it as invalid. A SRD/SREM is able to detect the special CRC, verify the signature, and execute the script to respond to the SIGNAL_PEER verdict. Upon receiving the signal response, the SRD 100 records the peer as "smart" capable in its internal lists to be preferred during routing.

Figure 7:
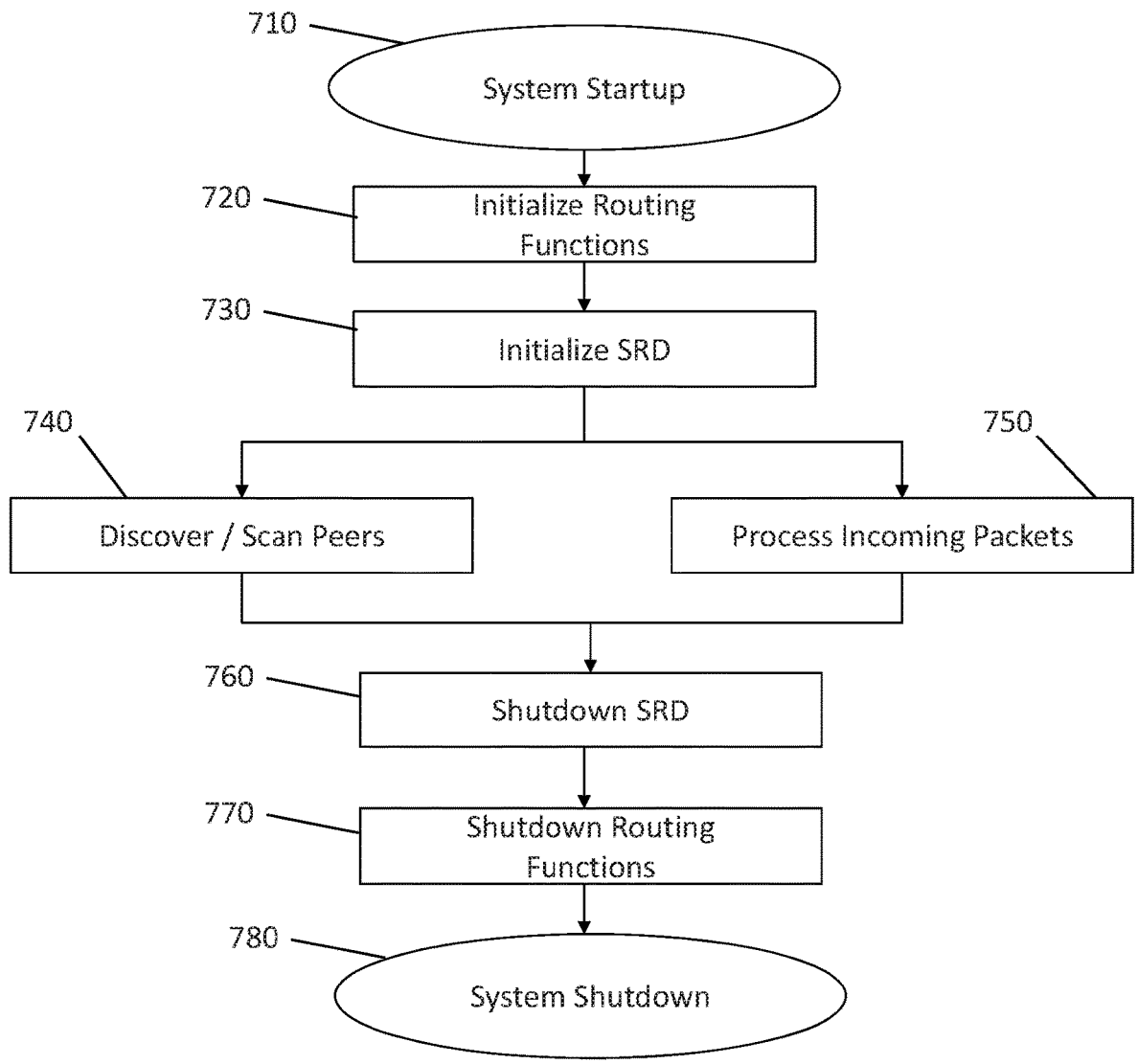
FIG. 7 is a flowchart illustrating a system workflow for handling smart packets, according to an embodiment.

FIG. 7 is a flowchart 700 illustrating a general system workflow for handling smart packets, according to an embodiment. System startup is initiated at 710 of the workflow. At 720, routing functions are initialized, and at 730, the SRD 100 is initialized.

Two concurrent operations may then be performed at the SRD 100: at 740, discovering/scanning of peers, and at 750, processing of incoming packets. At 760, the SRD 100 is shutdown, and the routing functions are shutdown at 770. The workflow ends with system shutdown at 780.

Figure 8:
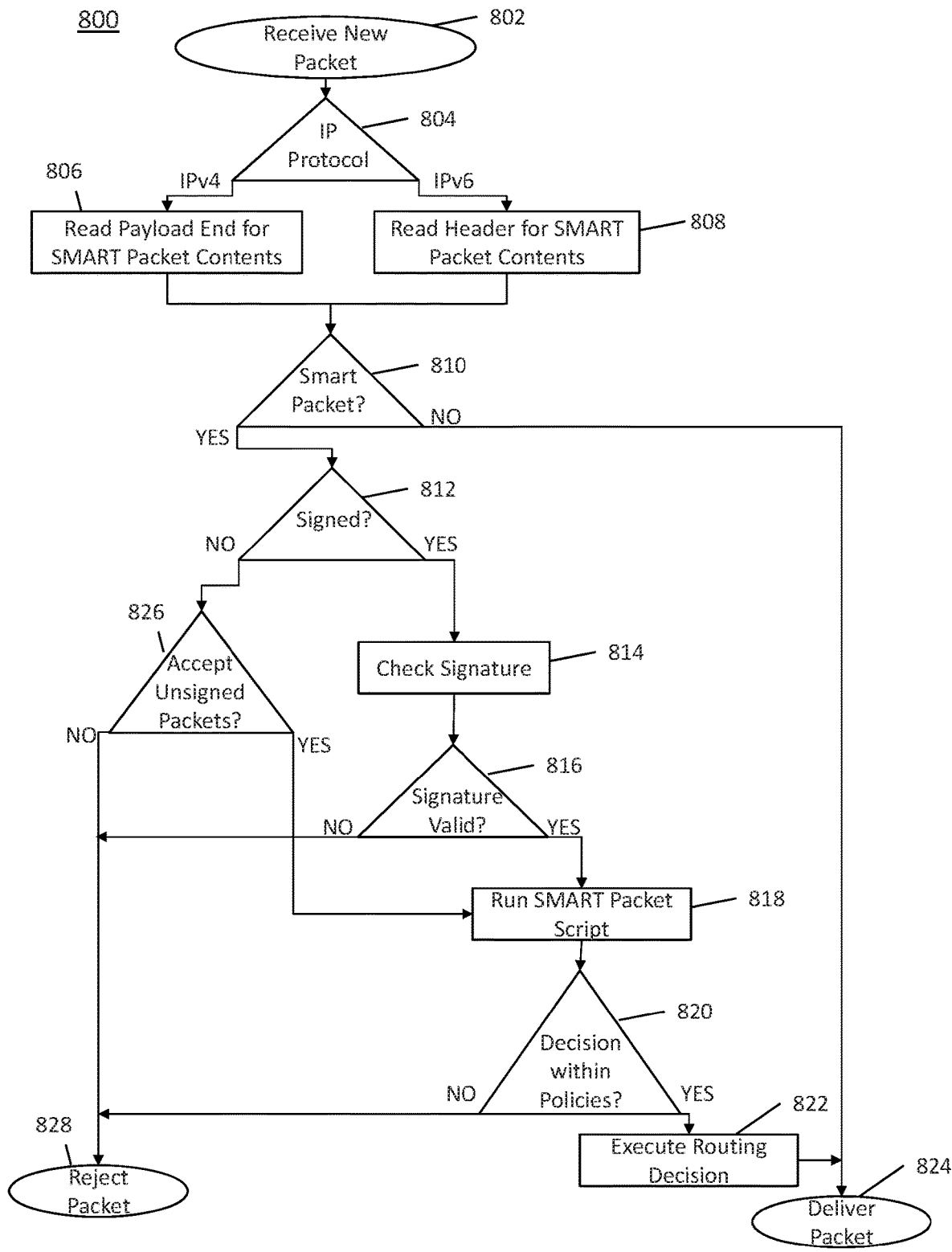
FIG. 8 is a flowchart illustrating a smart packet processing workflow, according to another embodiment.

FIG. 8 is a flowchart 800 illustrating a smart packet processing workflow, according to another embodiment. The workflow begins at 802 with receiving a new packet. At 804, a determination is made as to the type of IP protocol. If the protocol is IPv4, at 806, the payload end is read for smart packet contents (e.g., see FIG. 4A). If the protocol is IPv6, at 808, the header is read for smart packet contents (e.g., see FIG. 4B). In some embodiments, if the protocol is IPv6, payload end may be read for the smart packet contents.

At 810, a determination is made as to whether the packet is a smart packet. If the packet is not a smart packet, the packet is delivered at 824 without the smart packet processing. If, however, the packet is a smart packet, at 812, a determination is made as to whether the packet is signed. If the packet is signed, at 814, the signature is checked. At 816, a determination is made as to whether the signature is valid. If the signature is not valid, at 828, the packet is rejected. If the signature is valid, at 818, the smart packet script is run, and at 820, a determination is made as to whether the routing decision is within predefined policies. If no, at 828, the packet is rejected. If the routing decision is within predefined policies, at 822, the routing decision is executed. At 824, the packet is delivered.

Returning to the determination at 812 regarding if the packet is signed, if the packet is not signed, at 826, a determination is made as to whether unsigned smart packets are accepted. If unsigned smart packets are accepted, the workflow proceeds to 818, to run the smart packet script and follow the operations described above. If unsigned smart packets are not accepted, then the packet is rejected at 828.

Figure 9:
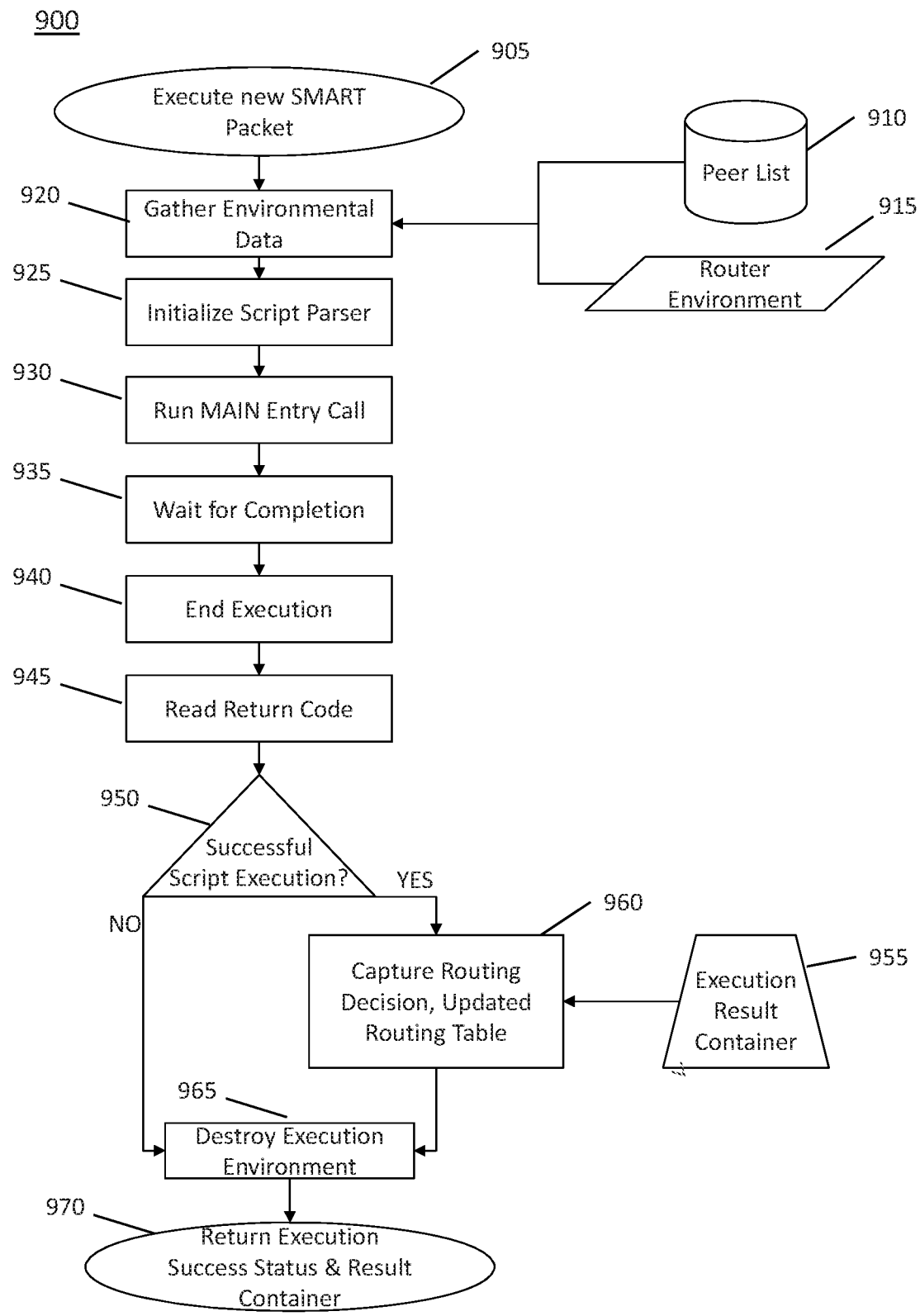
FIG. 9 is a flowchart illustrating a smart packet execution process, according to an embodiment.

FIG. 9 is a flowchart 900 illustrating a smart packet execution process, according to an embodiment. The process starts at 905 by executing a new smart packet. From a peer list 910 and router environment 915, environmental data is gathered at 920. At 925, a script parser is initialized. At 930, the main entry call is run. At 935, a wait for completion operation is performed. In some embodiments, there may be a maximum timeout, such as, for example, one second. At 940, execution is ended, and at 945, the return code is read.

A determination is made at 950 as to whether the script execution is successful. If it is determined to be successful, at 960, from an execution result container 955, a routing decision and an updated routing table are captured. At 965, following the capturing operation at 960 or the negative determination of a successful script execution, the execution environment is destroyed. At 970, the execution success status and result container are returned.

Figure 10:
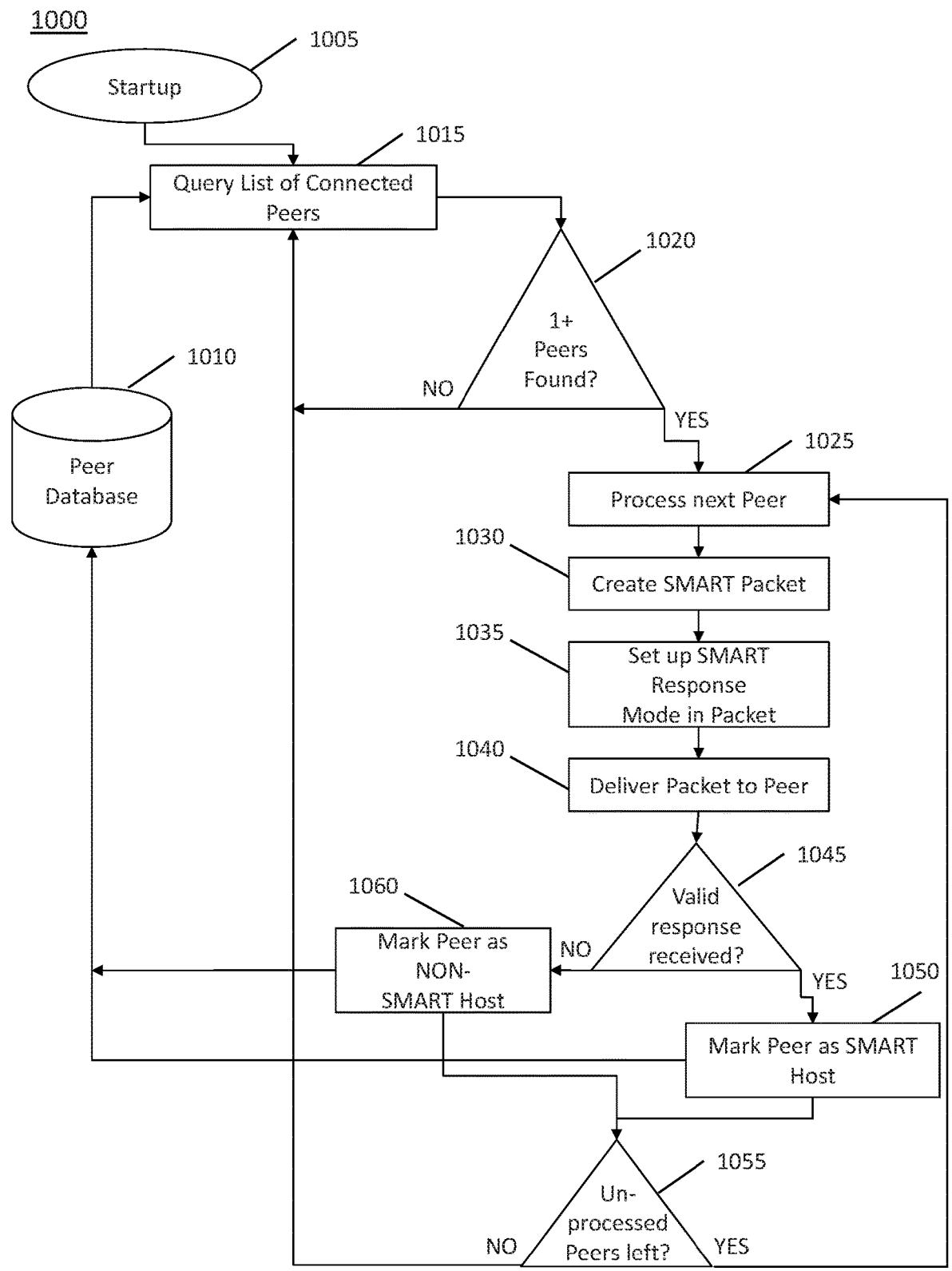
FIG. 10 is a flowchart illustrating a peer discovery method, according to an embodiment.

FIG. 10 is a flowchart 1000 illustrating a peer discovery method, according to an embodiment. The process starts at 1005. At 1015, from a peer database 1010, a list of connected peers are queried. At 1020, a determination is made as to whether one or more peers are found. If the determination is negative, the process repeats the step at 1015 of querying for a list of connected peers.

If the determination at 1020 is that one or more peers are found, then at 1025, the next peer is processed. At 1030, a smart packet is created. At 1035, a smart response mode in the packet is established. At 1040, the packet is delivered to the peer.

At 1045, a determination is made as to whether a valid smart response is received from the peer. If a valid response is received, at 1050, the peer is identified as a smart host, and the identification is provided to the peer database 1010. At 1060, if a valid response is not received, the peer is identified as a non-smart host, and the relevant information is provided to the peer database 1010.

At 1055, a determination is made as to whether any unprocessed peers remain. If there are none, the process repeats the step at 1015 of querying for a list of connected peers. If unprocessed peers remain, then the next peer is processed at 1025, and the operation described above is repeated for the next peer.

According to embodiments herein, the scripts are associated with particular network streams and allow for a level of granularity in which the sender possesses control and can encode for a particular stream of data how it should be delivered and the network devices/routes it must traverse. For example, the script may state that only wired network connections are acceptable and that the packets must never be sent through a wireless interface. The API, according to embodiments herein, can provide such information, as the API lets the script perform various queries from within the network device.

Other examples of scenarios that may be scripted within a packet include: dynamically created tunnels and subnets that may exist only for a particular stream of packets; and duplication of packets on certain nodes where more than one network path is available or where an unreliable network connection causes packets to be dropped. Another example is requesting specific modes of operation for certain packet streams based on a contract (for example, a customer made a contract with an internet search provider (ISP), the ISP is granting a customer a validation token for requesting a better quality of service (QoS) in the scripts, the script can decide if the token must be used (i.e., certain conditions are met as specified in the script) and if it is the case, request a higher QoS from a particular network device for this particular network stream, providing an option for monetization where a customer expresses in the script when he wants to use a certain paid service). Availability of API features may be dependent on the provider and contract used (e.g., a given provider may offer more flexibility in routing options for premium users). In another example, embodiments described herein may be used at network demarcation points in a network environment that may require more sophisticated network routing schemes or protection from data leaking or breaches inside a network. For example, network traffic can be transparently tunneled through the network while the tunnel itself has scripted rules to not allow traffic to leave a certain area or travel through insecure network devices.

According to embodiments herein, the execution environment 150 and the running scripts may be hidden from the SRD that executes the script. This isolation allows for a better security since the device cannot intervene in the decision making process even when the device is compromised or breached. Moreover, this type of protection may work the other way around, providing a sandbox environment as described above for the script to be executed in, limiting the script interactions with the device to a standardized set of API calls.

According to embodiments provided herein, the adoption of existing network protocols can be done through transparent tunneling, as any network protocol can be carried as a payload and the payload can be released back into the network at an exit point of the tunnel without any modifications to the payload itself.

Embodiments herein may be implemented as a configuration stream, which can traverse all or a set of network devices, executing a script that configures a network device; thus, effectively, configuring all of the selected network devices along the way. The network device, for example, may use some sort of signature verification process to allow for an extended set of capabilities for the script, which are typically restricted.

Embodiments herein may be implemented as a monitoring system, sending a packet with specific instructions to traverse a particular set of nodes and gather information and statistics. When the last node is traversed, the stream may go back to the original sender, carrying all of the collected data. The collected data may be stored in a packet memory, which may be extended when needed by adding new packets to the data stream.

Examples of factors that can be used when making a routing decision (environmental information available through the API) include: geolocation (the location of the network device); wireless/wired interfaces (i.e., the type of network interface); encryption available (the script can encrypt itself or data or some parts of a packet); discovery and monitoring (if there are statistics or additional details available for a given network route, those can be used in the decision making process; the network device can itself run some kind of a network discovery protocol to query its neighbors for additional information and provide the replies to the script through the API); and metering (if there are metrics available through any other routing protocol also running on the system, this information may also be referred by the script through the API).

According to an embodiment, a script may be embedded in the following ways depending on, for example, need, fragmentation, and size: in the first packet only (a train-like sequence where only the first packet carries the script and the rest of the packets are the payload); split over multiple packets in a defined sequence (allowing for more reliability, where if some packets, including the first one, are lost, the data can still maintain the intelligence to decide where to go); identical copies in every packet; and a combination with adaptions to the script.

In an additional embodiment, a check along the way is provided, where the first packet with the script embedded travels all the way to the destination, verifying the trustworthiness of all of the network devices along the way. Only if all the checks pass, is the actual data stream allowed to be sent. For example, the data stream can be stored in a buffer until the verification packet signals that the path is secure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
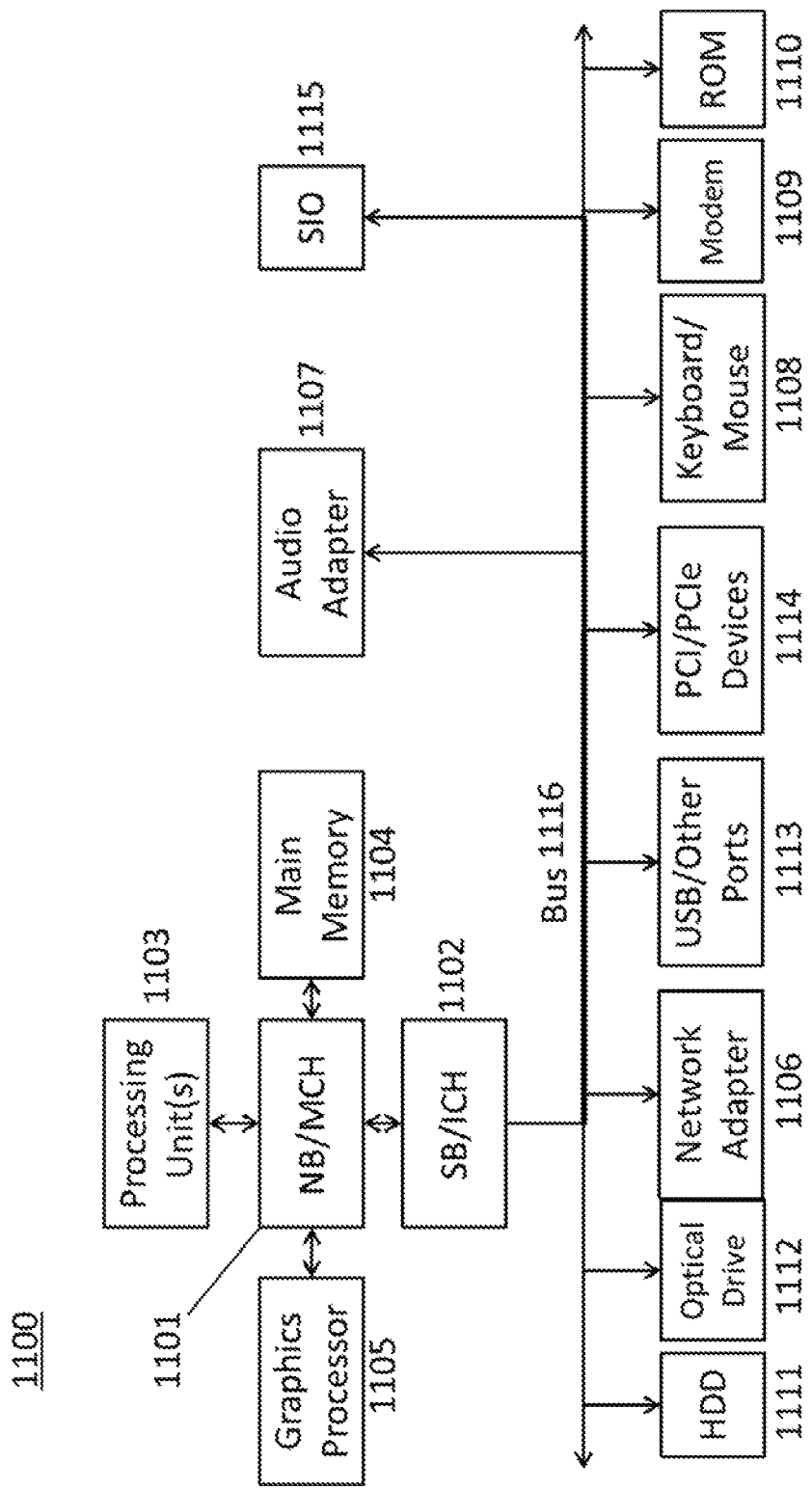
FIG. 11 is a block diagram of an example data processing system in which aspects of the illustrative embodiments may be implemented.

FIG. 11 is a block diagram of an example data processing system 1100 in which aspects of the illustrative embodiments are implemented. Data processing system 1100 is an example of a computer, such as a server or client, in which computer usable code or instructions implementing the process for illustrative embodiments of the present invention are located. In one embodiment, FIG. 11 may represent a server computing device.

In the depicted example, data processing system 1100 can employ a hub architecture including a north bridge and memory controller hub (NB/MCH) 1101 and south bridge and input/output (I/O) controller hub (SB/ICH) 1102. Processing unit 1103, main memory 1104, and graphics processor 1105 can be connected to the NB/MCH 1101. Graphics processor 1105 can be connected to the NB/MCH 1101 through, for example, an accelerated graphics port (AGP).

In the depicted example, a network adapter 1106 connects to the SB/ICH 1102. An audio adapter 1107, keyboard and mouse adapter 1108, modem 1109, read only memory (ROM) 1110, hard disk drive (HDD) 1111, optical drive (e.g., CD or DVD) 1112, universal serial bus (USB) ports and other communication ports 1113, and PCI/PCIe devices 1114 may connect to the SB/ICH 1102 through bus system 1116. PCI/PCIe devices 1114 may include Ethernet adapters, add-in cards, and PC cards for notebook computers. ROM 1110 may be, for example, a flash basic input/output system (BIOS). The HDD 1111 and optical drive 1112 can use an integrated drive electronics (IDE) or serial advanced technology attachment (SATA) interface. A super I/O (SIO) device 1115 can be connected to the SB/ICH 1102.

An operating system can run on processing unit 1103. The operating system can coordinate and provide control of various components within the data processing system 1100. As a client, the operating system can be a commercially available operating system. An object-oriented programming system, such as the Java programming system, may run in conjunction with the operating system and provide calls to the operating system from the object-oriented programs or applications executing on the data processing system 1100. As a server, the data processing system 1100 can be an IBM® eServer™ System P® running the Advanced Interactive Executive operating system or the Linux operating system. The data processing system 1100 can be a symmetric multiprocessor (SMP) system that can include a plurality of processors in the processing unit 1103. Alternatively, a single processor system may be employed.

Instructions for the operating system, the object-oriented programming system, and applications or programs are located on storage devices, such as the HDD 1111, and are loaded into the main memory 1104 for execution by the processing unit 1103. The processes for embodiments described herein can be performed by the processing unit 1103 using computer usable program code, which can be located in a memory such as, for example, main memory 1104, ROM 1110, or in one or more peripheral devices.

A bus system 1116 can be comprised of one or more busses. The bus system 1116 can be implemented using any type of communication fabric or architecture that can provide for a transfer of data between different components or devices attached to the fabric or architecture. A communication unit such as the modem 1109 or the network adapter 1106 can include one or more devices that can be used to transmit and receive data.

Those of ordinary skill in the art will appreciate that the hardware depicted in FIG. 11 may vary depending on the implementation. Other internal hardware or peripheral devices, such as flash memory, equivalent non-volatile memory, or optical disk drives may be used in addition to or in place of the hardware depicted. Moreover, the data processing system 1100 can take the form of any of a number of different data processing systems, including but not limited to, client computing devices, server computing devices, tablet computers, laptop computers, telephone or other communication devices, personal digital assistants, and the like. Essentially, data processing system 1100 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method to dynamically alter routing decisions of internet protocol (IP) packets being sent through a network of interconnected devices, the method comprising:

extending an IP packet to add a routing script, wherein routing requirements and decisions of a client are stored in the routing script;

extending client software and protocols of a network device to execute the routing script;

extracting the routing script from the extended IP packet;

executing the routing script to obtain script results;

changing a routing decision based on the script results;

delivering the extended IP packet to a destination system within the network of interconnected devices based on the changed routing decision;

processing the routing script to determine if the routing script is securely signed;

if the routing script is securely signed,
   initializing a sandbox with an environment stack of information containers and a scripting toolbox containing a predefined set of scripting templates, wherein the information containers include a router status information container, a network status information container, and an environment information container;

executing the routing script in the sandbox; and outputting a routing verdict and a routing list comprising an updateable list of routing peers from the sandbox; and maintaining a list of smart capable router peers by querying a node on a list of known, connected routing nodes, wherein a smart capable router peer is capable of recognizing the extended IP packet and executing the routing script, wherein the querying comprises:

transmitting a smart packet having a cyclic redundancy code only detectable by the smart capable router peers, to the node on the list of known, connected routing nodes; and marking a particular node on the list of known, connected routing nodes as a smart capable router peer if the particular node detects the cyclic redundancy code and properly responds to the smart packet.

2. The method of claim 1, further comprising extending router systems to detect the extended IP packet.

3. The method of claim 1, further comprising, for transmission over the network via one or more non-smart nodes, one of: preventing the delivery of the extended IP packet, or restoring the extended IP packet to its original form.

4. The method of claim 1, wherein the changed routing decision is determined based on availability of smart capable nodes.

5. A system to dynamically alter routing decisions of internet protocol (IP) packets being sent through a network of interconnected devices, the system comprising:

a network device that is part of the network of interconnected devices, the network device comprising a processor configured to:

extend an IP packet to add a routing script, wherein routing requirements and decisions of a client are stored in the routing script;

extend client software and protocols of the network device to execute the routing script;

extract the routing script from the extended IP packet;
execute the routing script to obtain script results;
change a routing decision based on the script results; and
deliver the extended IP packet to a destination system within the network of interconnected devices based on the changed routing decision;
process the routing script to determine if the routing script is securely signed;
if the routing script is securely signed,
  initialize a sandbox with an environment stack of information containers and a scripting toolbox containing a predefined set of scripting templates, wherein the information containers include a router status information container, a network status information container, and an environment information container;
  execute the routing script in the sandbox; and
  output a routing verdict and a routing list comprising an updateable list of routing peers from the sandbox; and
  maintain a list of smart capable router peers by querying a node on a list of known, connected routing nodes, wherein a smart capable router peer is capable of recognizing the extended IP packet and executing the routing script, wherein the querying comprises:
    transmit a smart packet having a cyclic redundancy code only detectable by the smart capable router peers, to the node on the list of known, connected routing nodes; and
    mark a particular node on the list of known, connected routing nodes as a smart capable router peer if the particular node detects the cyclic redundancy code and properly responds to the smart packet.

6. The system of claim 5, wherein the processor is further configured to extend router systems to detect the extended IP packet.

7. The system of claim 5, wherein the processor is further configured to, for transmission over the network via one or more non-smart nodes, one of: prevent the delivery of the extended IP packet, or restore the extended IP packet to its original form.

8. The system of claim 5, wherein the changed routing decision is determined based on availability of smart capable nodes.

9. A computer implemented method to dynamically alter routing decisions of internet protocol (IP) packets being sent through a network of interconnected devices, the method comprising:
  extending a network packet to include code payload executable on a network device, wherein the code payload includes user-defined algorithms and user-defined constraints used by a decision making module on the network device, wherein the network packet includes a header and a first payload, wherein the extended network packet includes the header, the first payload and a second payload, wherein the second payload is the code payload; and
  extending network device software and network protocols to provide an execution environment for the code payload upon receiving the network packet, wherein the code payload of the packet is executed on the execution environment of the network device;
  wherein execution of the code payload extends existing network device algorithms to provide an adaptive routing decision process, wherein the routing decision process is based on the execution of the user-defined code payload and context provided by the execution environment;
  processing the routing script to determine if the routing script is securely signed;
  if the routing script is securely signed,
    initializing a sandbox with an environment stack of information containers and a scripting toolbox containing a predefined set of scripting templates, wherein the information containers include a router status information container, a network status information container, and an environment information container;
    executing the routing script in the sandbox; and
    outputting a routing verdict and a routing list comprising an updateable list of routing peers from the sandbox;
  maintaining a list of smart capable router peers by querying a node on a list of known, connected routing nodes, wherein a smart capable router peer is capable of recognizing the extended IP packet and executing the routing script, wherein the querying comprises:
    transmitting a smart packet having a cyclic redundancy code only detectable by the smart capable router peers, to the node on the list of known, connected routing nodes; and
    marking a particular node on the list of known, connected routing nodes as a smart capable router peer if the particular node detects the cyclic redundancy code and properly responds to the smart packet.

10. The method of claim 9, wherein the routing decision process enforces logical network boundaries through the user-defined constraints, wherein the user-defined constraints limit a packet network path to a subset of trusted network areas.

11. The method of claim 9, further comprising extending router systems to detect the extended network packet.

12. The method of claim 9, further comprising:
  delivering the extended network packet to a destination system within the network of interconnected devices based on the adaptive routing decision process.

13. The method of claim 1, wherein the routing script is added at an end of the IP packet or as part of a header of the IP packet; and wherein a packet structure is updated to reflect the extension.

14. The system of claim 5, wherein the routing script is added at an end of the IP packet or as part of a header of the IP packet; and wherein a packet structure is updated to reflect the extension.

* * * * *